(12) United States Patent
Zhang et al.

(10) Patent No.: US 11,268,568 B2
(45) Date of Patent: Mar. 8, 2022

(54) ASSEMBLING STRUCTURE FOR A CEILING FAN

(71) Applicant: FOSHAN CARRO ELECTRICAL CO., LTD., Foshan (CN)

(72) Inventors: Jiansheng Zhang, Foshan (CN); Zhiqiang Yuan, Foshan (CN); Ruhui Huang, Foshan (CN)

(73) Assignee: Fóshan Carro Electrical Co., Ltd., Foshan (CN)

( * ) Notice: Subject to any disclaimer, the term of this patent is extended or adjusted under 35 U.S.C. 154(b) by 287 days.

(21) Appl. No.: 16/675,478

(22) Filed: Nov. 6, 2019

(65) Prior Publication Data
US 2020/0362910 A1    Nov. 19, 2020

(30) Foreign Application Priority Data
May 13, 2019   (CN) .......................... 201920676116.5

(51) Int. Cl.
*F16C 11/06* (2006.01)
*F24F 13/32* (2006.01)
*F04D 25/08* (2006.01)

(52) U.S. Cl.
CPC ........ *F16C 11/0695* (2013.01); *F04D 25/088* (2013.01); *F16C 11/0661* (2013.01); *F24F 13/32* (2013.01)

(58) Field of Classification Search
CPC ...... F04D 25/088; F04D 29/60; F04D 29/601; F04D 29/602; F16M 11/14; F16M 11/08; F16M 11/041; F16M 11/10
See application file for complete search history.

(56) References Cited

U.S. PATENT DOCUMENTS

| | | | | |
|---|---|---|---|---|
| 4,073,598 A | * | 2/1978 | Mizutani | F04D 25/0613 416/170 R |
| 4,697,777 A | * | 10/1987 | Yang | F16M 11/10 248/343 |
| 4,714,230 A | * | 12/1987 | Huang | F04D 25/088 248/343 |
| 4,729,725 A | * | 3/1988 | Markwardt | F04D 25/088 416/244 R |
| 4,871,327 A | * | 10/1989 | Ridgway | F16B 35/044 439/543 |
| 5,090,654 A | * | 2/1992 | Ridings | F04D 29/601 248/288.31 |
| 5,222,864 A | * | 6/1993 | Pearce | F04D 25/088 248/344 |

(Continued)

*Primary Examiner* — Daniel J Wiley
(74) *Attorney, Agent, or Firm* — Rosenberg, Klein & Lee

(57) ABSTRACT

An assembling structure for a ceiling fan has a hanging rod, a hanging ball, and a hanging bracket. A top end of the hanging rod forms a bending edge. The hanging ball has a first hole and a supporting wall. The hanging rod is mounted through the first hole. The supporting wall has a supporting platform abutting a bottom surface of the bending edge. The hanging bracket has a ball mounting segment and a ceiling mounting segment adapted to be mounted to a ceiling. The ball mounting segment has a hanging hole. A diameter of the hanging hole is smaller than a diameter of the hanging ball. The hanging ball abuts downward a periphery of the hanging hole. The hanging rod is mounted through the hanging hole. With a large contact area between the hanging rod and the hanging ball, the structural strength is high.

16 Claims, 14 Drawing Sheets

(56) References Cited

U.S. PATENT DOCUMENTS

| | | | | |
|---|---|---|---|---|
| 5,947,436 A * | 9/1999 | Bucher | F04D 29/601 | 248/345 |
| 6,042,072 A * | 3/2000 | Chi-Nan | F04D 25/088 | 248/222.52 |
| 6,116,559 A * | 9/2000 | Lackey | F04D 29/601 | 248/343 |
| 6,139,279 A * | 10/2000 | Pearce | F04D 25/088 | 416/244 R |
| 6,200,095 B1 * | 3/2001 | Bucher | F04D 25/088 | 416/244 R |
| 6,203,279 B1 * | 3/2001 | Moody | F04D 25/088 | 248/343 |
| 6,280,145 B1 * | 8/2001 | Liu | F04D 25/088 | 416/244 R |
| 6,311,943 B1 * | 11/2001 | Tang | F04D 25/088 | 248/317 |
| 6,439,527 B1 * | 8/2002 | Lin | F04D 25/088 | 248/222.52 |
| 6,598,846 B1 * | 7/2003 | Lackey, Jr. | F16B 21/12 | 248/343 |
| 7,028,963 B1 * | 4/2006 | Silva | F04D 25/088 | 248/342 |
| 7,104,513 B2 * | 9/2006 | Blateri | F04D 25/088 | 248/342 |
| 7,527,232 B2 * | 5/2009 | Frampton | F04D 25/088 | 248/342 |
| 7,621,498 B2 * | 11/2009 | Tang | F04D 29/60 | 248/317 |
| 8,336,844 B2 * | 12/2012 | Pearce | F04D 29/601 | 248/345 |
| 9,587,518 B2 * | 3/2017 | Oleson | F04D 29/601 | |
| 9,816,516 B2 * | 11/2017 | Frampton | F16M 13/027 | |
| 9,897,095 B2 * | 2/2018 | Botkin | F04D 29/601 | |
| 10,590,960 B2 * | 3/2020 | Beaman | F04D 13/0693 | |
| 10,851,939 B2 * | 12/2020 | Trout | F04D 29/601 | |
| 2003/0213883 A1 * | 11/2003 | Fu-Liang | F04D 29/601 | 248/343 |
| 2006/0255226 A1 * | 11/2006 | Frampton | F04D 29/601 | 248/343 |
| 2008/0124224 A1 * | 5/2008 | Tsai | F04D 25/088 | 416/244 R |
| 2009/0230274 A1 * | 9/2009 | Tang | F04D 29/60 | 248/343 |
| 2020/0141537 A1 * | 5/2020 | Trout | F04D 29/646 | |

\* cited by examiner

ASSEMBLING STRUCTURE FOR A CEILING FAN

BACKGROUND OF THE INVENTION

1. Field of the Invention

The present invention relates to a fan, especially to a ceiling fan and an assembling structure for a ceiling fan.

2. Description of the Prior Arts

Two types of ceiling fans are available on the market. One is mounted on the ceiling directly while the other is mounted on the ceiling via an assembling structure comprising a hanging tube.

However, a conventional ceiling fan that is mounted on the ceiling via the assembling structure has an unstable connection to the ceiling because the hanging tube of the assembling structure is assembled with a hanging ball by a bolt, and therefore the structural strength of the assembling structure is low.

To overcome the shortcomings, the present invention provides an assembling structure for a ceiling fan to mitigate or obviate the aforementioned problems.

SUMMARY OF THE INVENTION

The main objective of the present invention is to provide an assembling structure for a ceiling fan. A hanging rod and a hanging ball of the assembling structure abut and are flush with each other. Thus, with a large contact area, the structural strength is high, thereby enhancing the stability of the ceiling fan.

The assembling structure has a hanging rod, a hanging ball, and a hanging bracket. A top end of the hanging rod forms a bending edge. A bottom end of the hanging rod is adapted to be connected to a motor of a ceiling fan. The hanging ball has a first hole and a supporting wall. The first hole is formed on a center of the hanging ball, and the hanging rod is mounted through the first hole. The supporting wall has a supporting platform formed on a top end of the supporting wall and extending along a circumference of the first hole. The supporting platform abuts a bottom surface of the bending edge. The hanging bracket has a ball mounting segment and a ceiling mounting segment. The ball mounting segment has a hanging hole formed on a center of the ball mounting segment. A diameter of the hanging hole is smaller than a diameter of the hanging ball. The hanging ball abuts downward a periphery of the hanging hole. The hanging rod is mounted through the hanging hole. The ceiling mounting segment is connected to the ball mounting segment, and is adapted to be mounted on a ceiling.

When the abovementioned assembling structure is applied, the hanging bracket is mounted on the ceiling. The hanging bracket, the hanging ball, and the hanging rod are connected and abut each other downwardly in sequence. The bottom end of the hanging rod is connected to the motor of the ceiling fan. Thus, the assembling structure assembles the ceiling fan to the ceiling. Besides, the bending edge of the hanging rod abuts the supporting platform of the hanging ball so that the hanging rod and the hanging ball abut and are flush with each other in surface contact. Thus, with a large contact area, the structural strength is high, thereby enhancing the stability of the ceiling fan.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
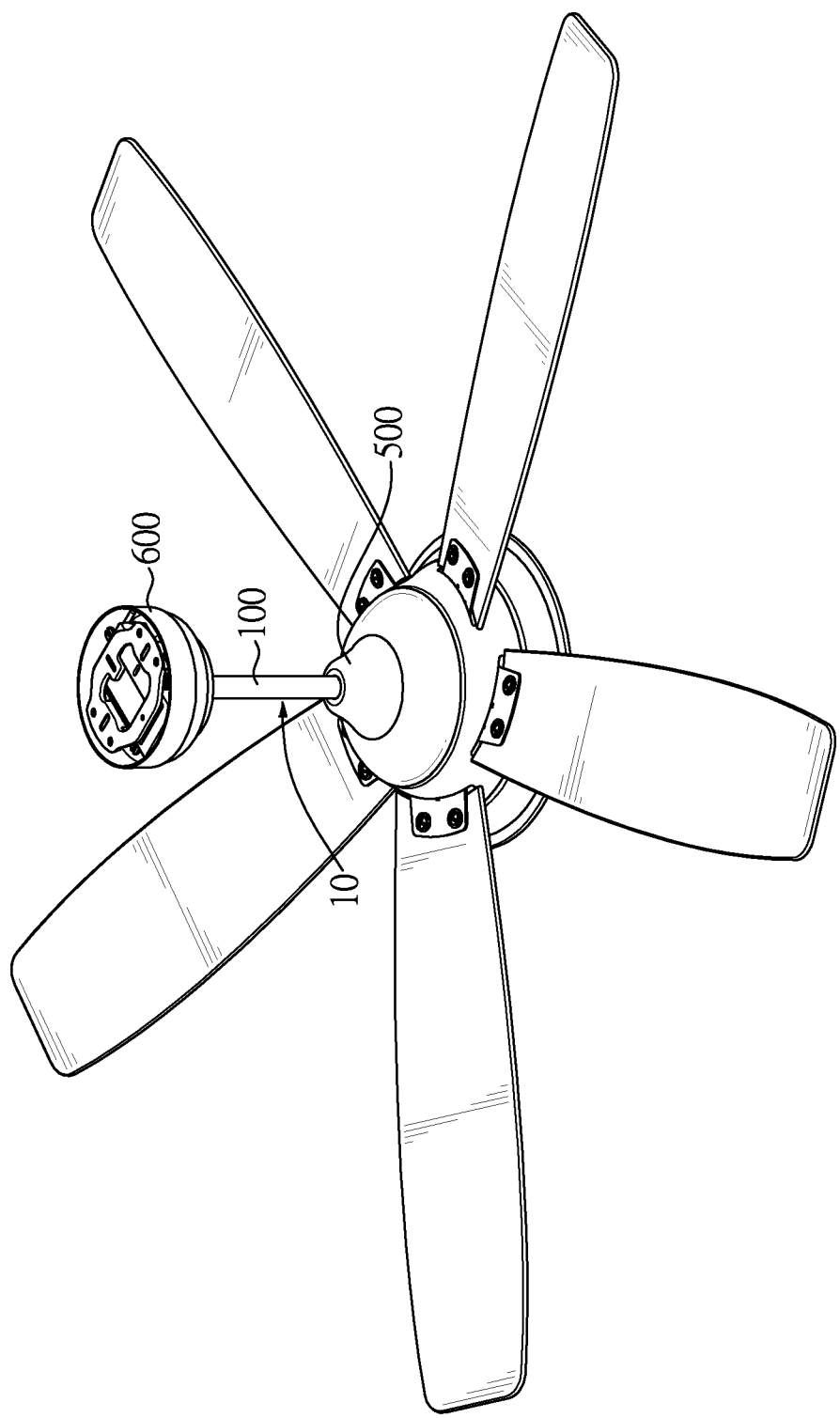
FIG. 1 is a perspective view of an assembling structure for a ceiling fan in accordance with the present invention.

FIG. 1 is a perspective view of a ceiling fan. With reference to FIGS. 1 to 4C, the ceiling fan comprises an assembling structure 10 and a motor 20. The motor 20 is hung on a ceiling by the assembling structure 10. The motor 20 is adapted to drive multiple fan blades to rotate.

Specifically, with reference to FIGS. 2 to 5, the assembling structure for a ceiling fan in accordance with the present invention comprises a hanging rod 100, a hanging ball 200, and a hanging bracket 300. The hanging rod 100 is an upright rod. A top end of the hanging rod 100 forms a bending edge 110, and a bottom end of the hanging rod 100 is adapted to be connected to the motor 20 of the ceiling fan. The hanging ball 200 has a supporting wall 210 and a first hole 220. The first hole 220 is formed on a center of the hanging ball 200. The hanging rod 100 is mounted through the first hole 220. The supporting wall 210 is formed on the center of the hanging ball 200 and surrounds the first hole 220. The supporting wall 210 has a supporting platform 211 formed on a top end of the supporting wall 210 and extending along the circumference of the first hole 220. The supporting platform 211 abuts a bottom surface of the bending edge 110. The hanging bracket 300 has a ball mounting segment 310 and a ceiling mounting segment 320. The ball mounting segment 310 has a hanging hole 311 formed on a center of the ball mounting segment 310. A diameter of the hanging hole 311 is smaller than a diameter of the hanging ball 200. The hanging ball 200 abuts downward a periphery of the hanging hole 311, and the hanging rod 100 is mounted through the hanging hole 311. The hanging hole 311 is adapted to hang the hanging ball 200. The ceiling mounting segment 320 is connected to a side of the ball mounting segment 310, and the ceiling mounting segment 320 is adapted to be mounted on a ceiling.

When the aforementioned assembling structure 10 is in use, the hanging bracket 300 is mounted on the ceiling. The hanging bracket 300, the hanging ball 200, and the hanging rod 100 are connected and abut one another downward in sequence. The bottom end of the hanging rod 100 is connected to the motor 20 of the ceiling fan, and therefore the assembling structure 10 hangs the ceiling fan on the ceiling. Wherein, the hanging rod 100 is mounted through the hanging ball 200, and the bending edge 110 of the hanging rod 100 is disposed and hung on the supporting platform 211 of the hanging ball 200 so that the hanging rod 100 and the hanging ball 200 abut and are flush with each other in surface contact. Thus, with a large contact area, the structural strength is high so that the stability of the ceiling fan is increased.

Besides, the hanging rod 100 and the hanging ball 200 are assembled by abutting without any screws, thereby saving time and effort. Relatively, in a conventional ceiling fan, the hanging rod of the assembling structure is assembled with a hanging ball by a bolt, and therefore the structural strength of the assembling structure is low, and the assembly also consumes more time. Additionally, no screw is used between the hanging rod 100 and the hanging ball 200 of the present invention, so the present invention is free from screw exposure and rusting and negative visual appearance derived from the exposure.

Figure 5:
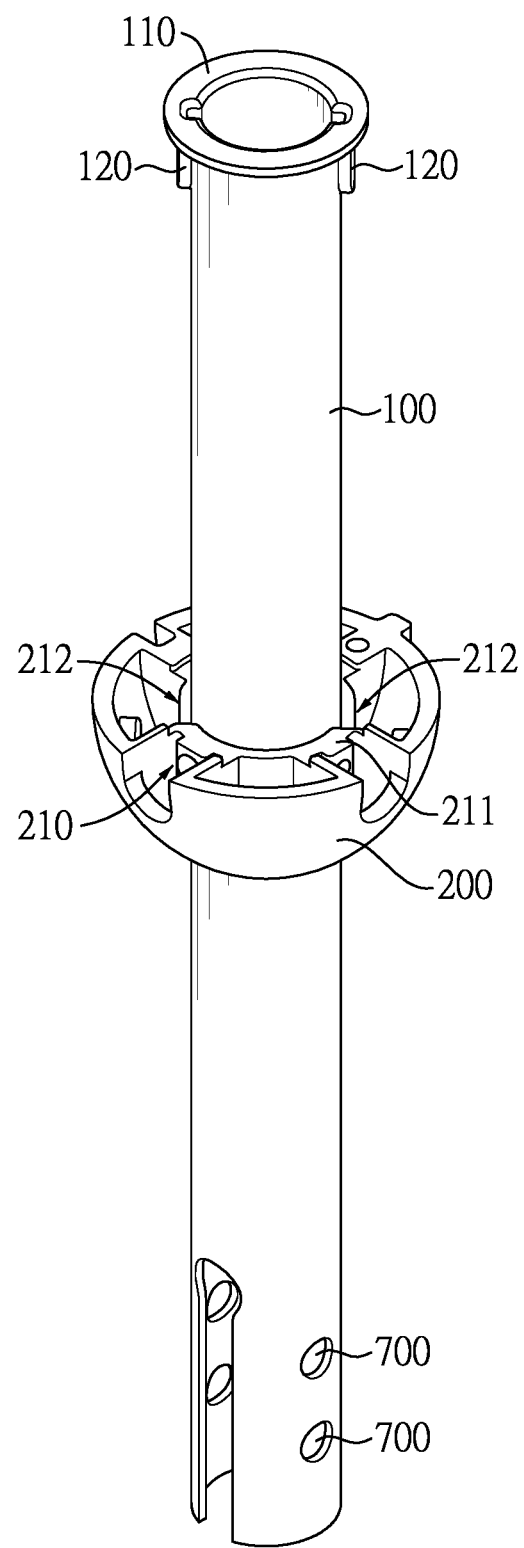
FIG. 5 is a perspective view of the assembling structure in FIG. 1, showing the hanging rod connected to the hanging ball.
Figure 6:
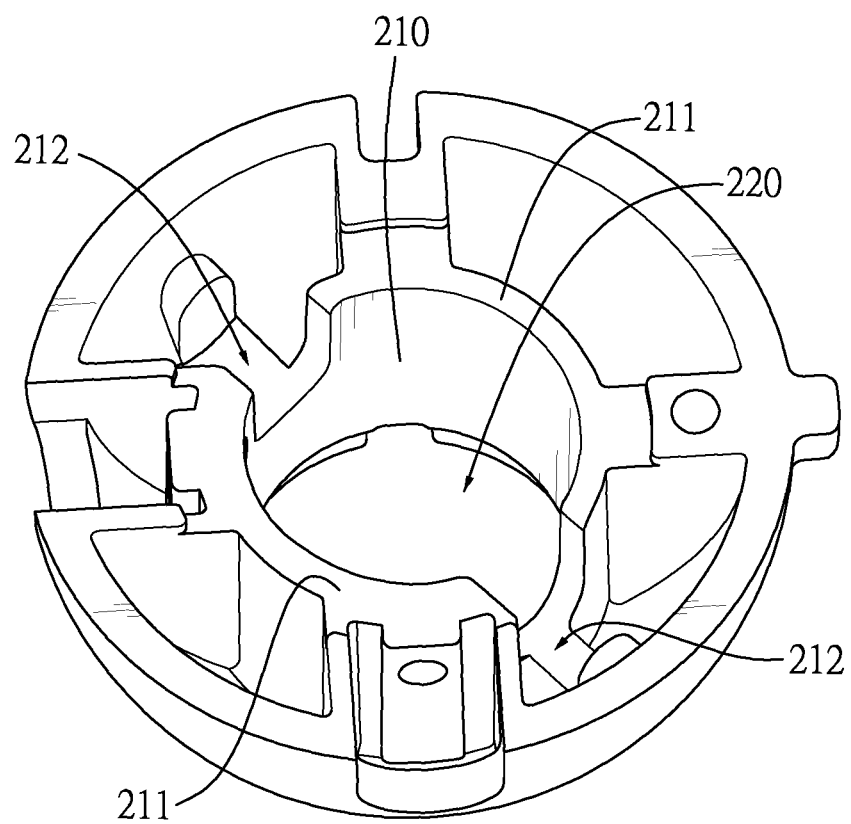
FIG. 6 is a perspective view of the assembling structure in FIG. 1, showing the hanging ball.
Figure 7:
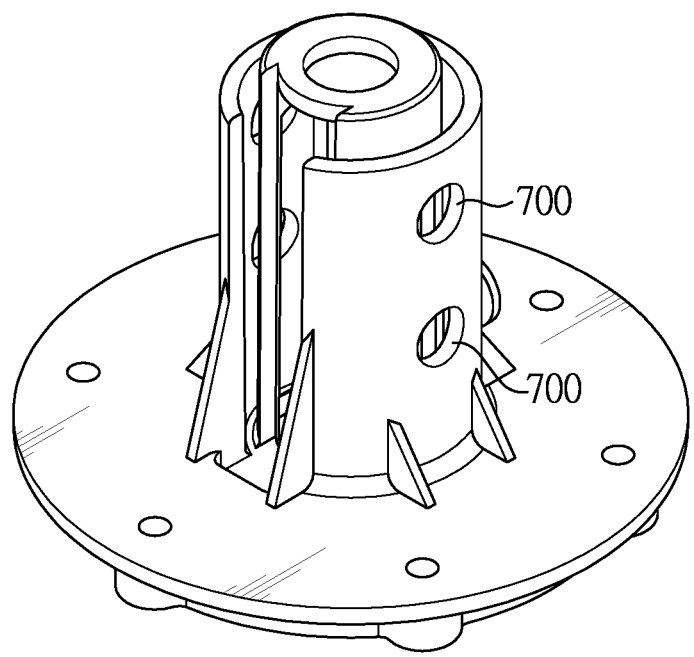
FIG. 7 is a perspective view of the assembling structure in FIG. 1, showing the rod fixing component.

Specifically, with reference to FIGS. 5 to 6, the top end of the hanging rod 100 further has at least one limiting protrusion 120. The supporting wall 210 forms at least one limiting groove 212 which is used to accommodate and support the at least one limiting protrusion 120, and the at least one limiting protrusion 120 is mounted in the at least one limiting groove 212. With the limiting groove 212, the hanging ball 200 prevents the hanging rod 100 from rotating and enhances the connection stability. Besides, the limiting protrusion 120 abuts an inner surface of the limiting groove 212, thereby enlarging the contact area between the hanging rod 100 and the hanging ball 200 and further enhancing the connection stability. In addition, in a preferred embodiment, an amount of the at least one limiting groove 212 is two. The two limiting grooves 212 are located on two ends of a diameter of the hanging ball 200 respectively, and the supporting platform 211 extends on two sides of each of the limiting grooves 212.

Furthermore, the supporting wall 210 can be flush with a side surface of the hanging rod 100, and the supporting platform 211 can be flush with the bottom surface of the bending edge 110. Thus, with a larger contact area, the hanging rod 100 and the hanging ball 200 are assembled more firmly. Additionally, the hanging rod 100, the bending edge 110, the hanging ball 200, and the supporting platform 211 are formed by extrusion molding, are polished, and fit with one another at high precision. Therefore, after assembled, the hanging rod 100 and the hanging ball 200 are prevented from shaking caused by gaps, and have a higher structural strength. Selectively, the hanging ball 200 can be formed integrally to have an enhanced structural strength.

Specifically, with reference to FIGS. 3, 4A, 4B, 4C and 7, the assembling structure 10 further comprises a rod fixing component 400, three fixing holes 700 and a fixing element 800. The hanging rod 100 is connected to the motor 20 of the ceiling fan via the rod fixing component 400. The rod fixing component 400, the hanging rod 100, and a spindle 201 of the motor 20 are mounted around one another in sequence. The fixing holes 700 are formed through the hanging rod 100, the rod fixing component 400, and the spindle 201 of the motor 20 respectively. The fixing holes 700 are aligned with each other for the fixing element 800 to horizontally mount through the fixing holes 700. The fixing element 800 is mounted through the fixing holes 700. By mounting the rod fixing component 400, the hanging rod 100, and the spindle 201 of the motor 20 around one another and mounting the fixing element 800 through the fixing holes 700, the rod fixing component 400, the hanging rod 100, and the spindle 201 of the motor 20 are assembled firmly, thereby enhancing the stability of the ceiling fan.

Additionally, the rod fixing component 400 is not made from metal, thereby preventing the hanging rod 100 and the spindle 201 of the motor 20, which are both made from metal, from direct abrasion. Thus, the non-metal rod fixing component 400 reduces abrasion and extends the life of the hanging rod 100 and the spindle 201 of the motor 20, and further solves the noise problem.

Specifically, the rod fixing component 400 is made from plastic or rubber, and the rod fixing component 400 is flexible. Thus, when a fixing component is driven through the rod fixing component 400, the rod fixing component 400 deforms and further tightens the fixing component 400, thereby increasing the connection stability between the hanging rod 100 and the spindle 201 of the motor 20, and reducing shaking and noise.

Figure 2:
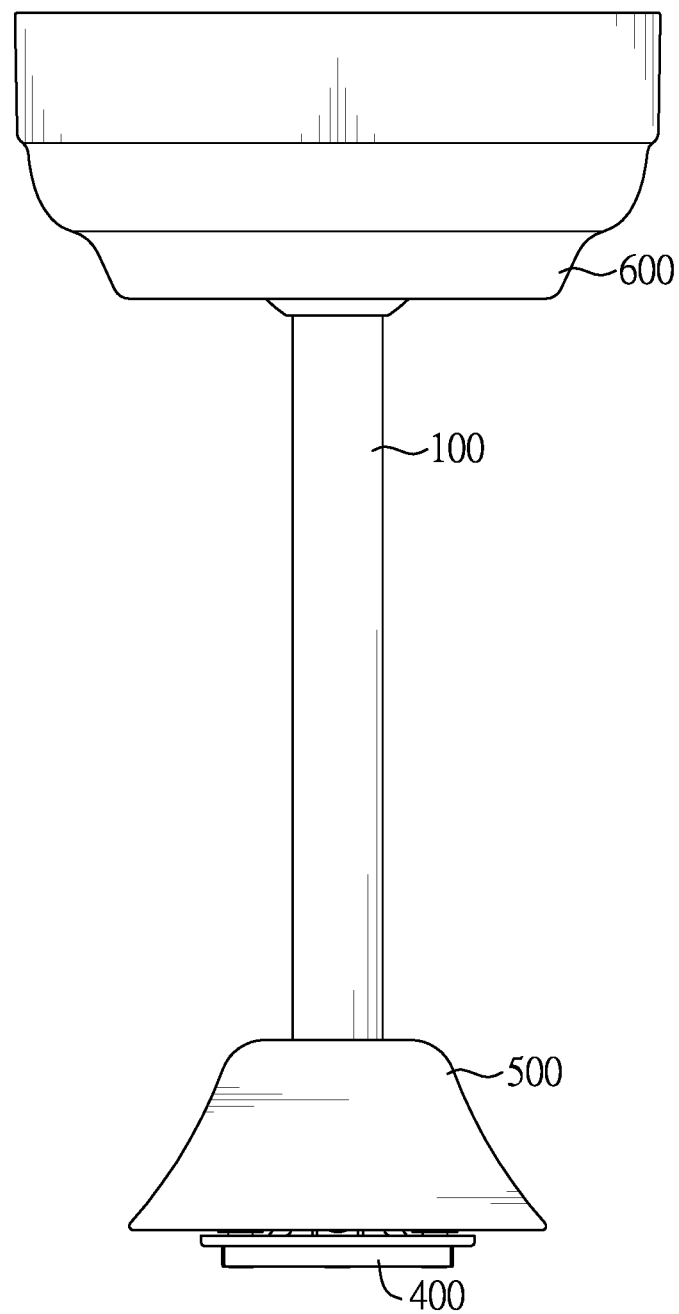
FIG. 2 is a side view of the assembling structure for a ceiling fan in FIG. 1.
Figure 3:
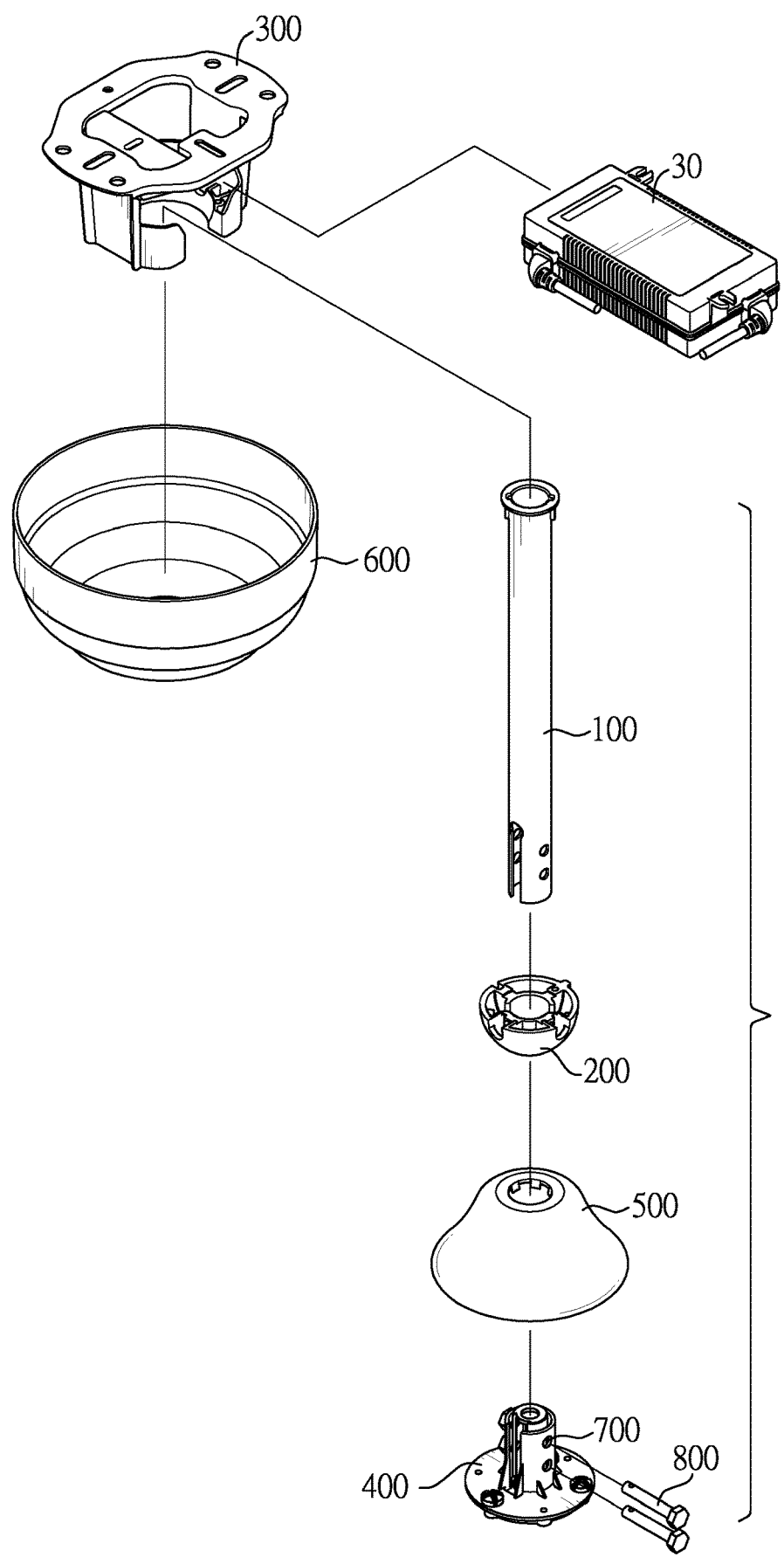
FIG. 3 is an exploded view of the assembling structure in FIG. 1.
Figure 4A:
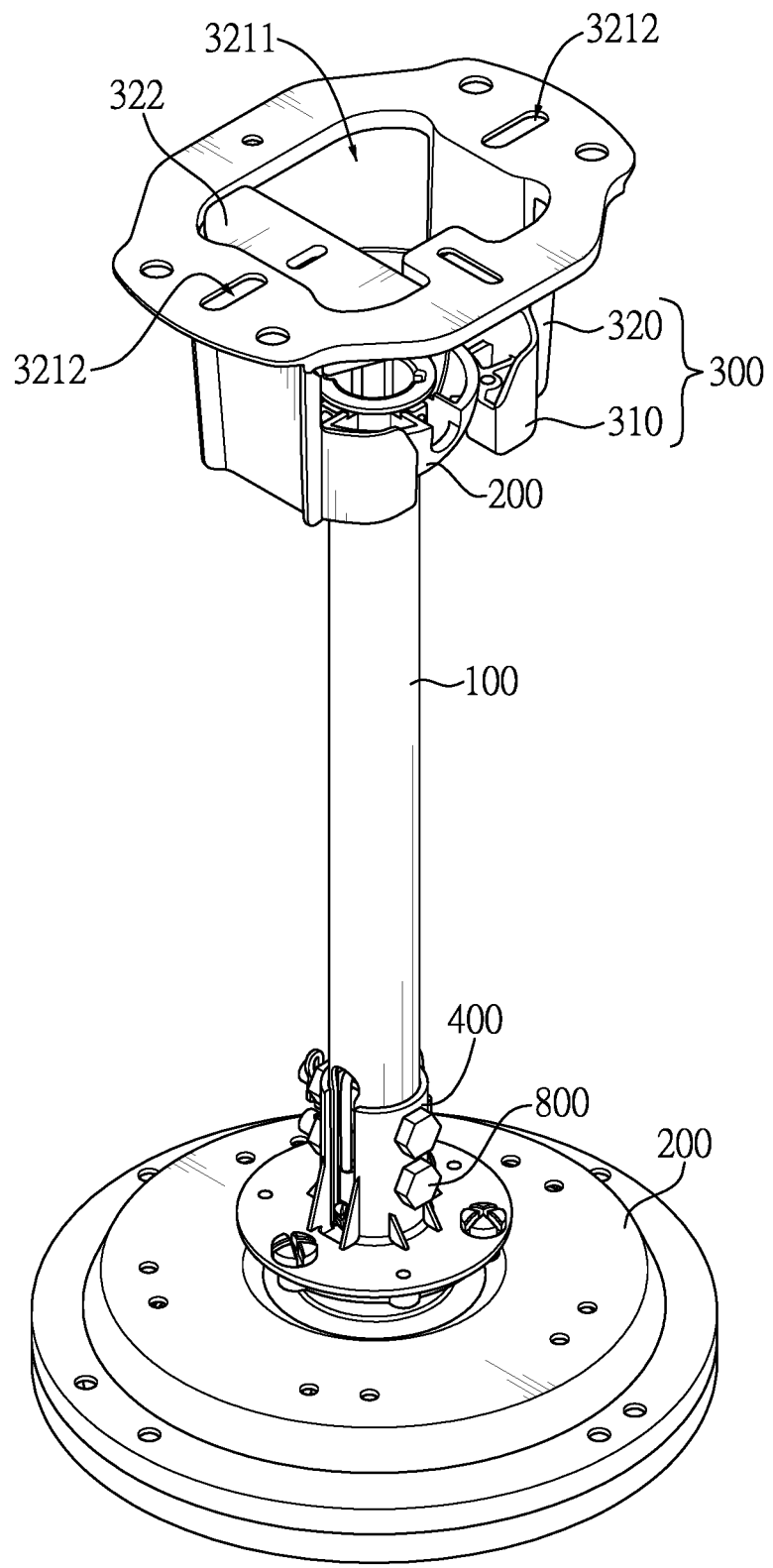
FIG. 4A is a perspective view of the assembling structure in FIG. 1, showing the assembling structure connected to the motor.
Figure 4B:
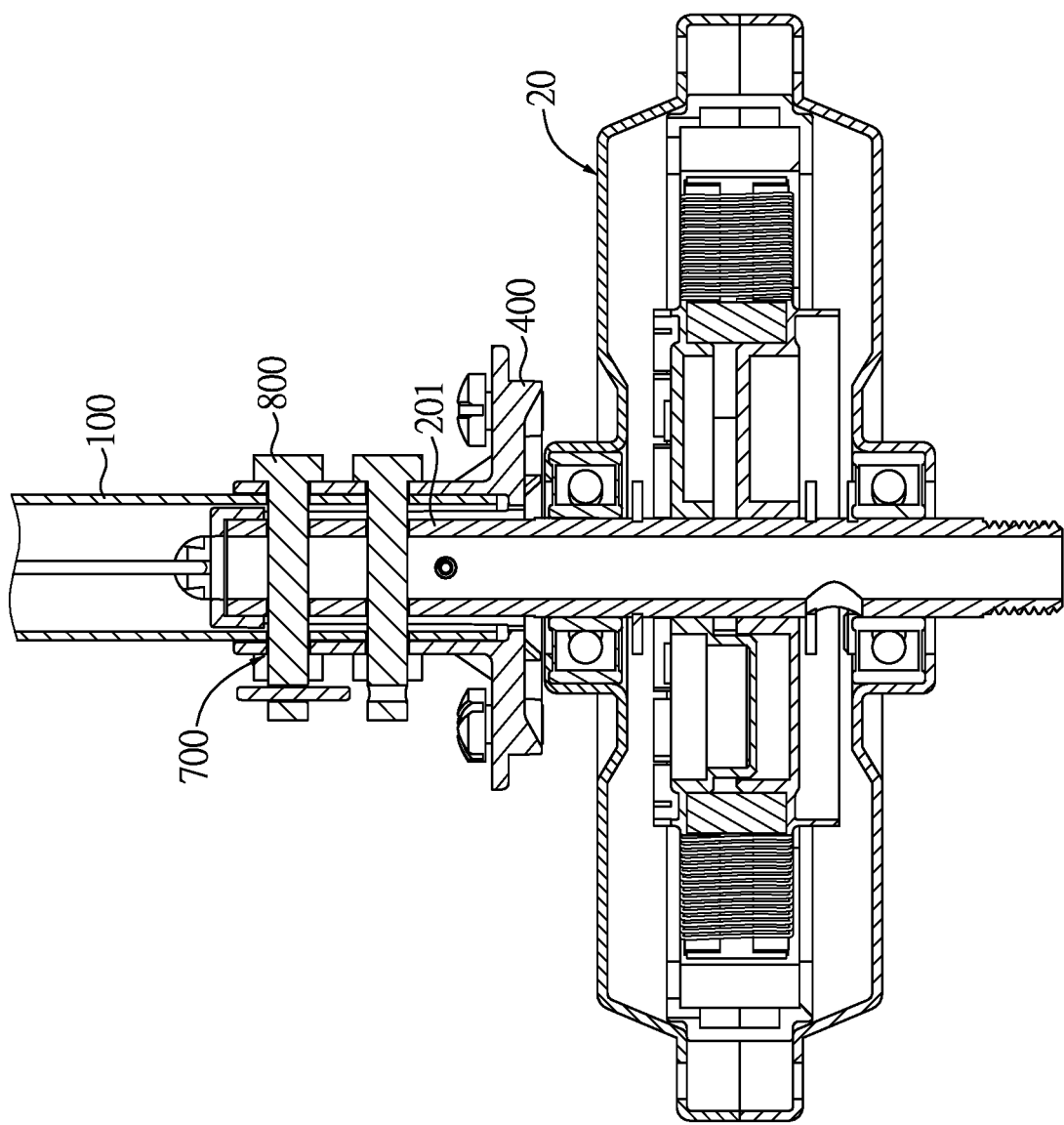
FIG. 4B is a side view in cross section of the assembling structure in FIG. 1, showing the hanging rod, the rod fixing component, and the spindle of the motor.
Figure 4C:
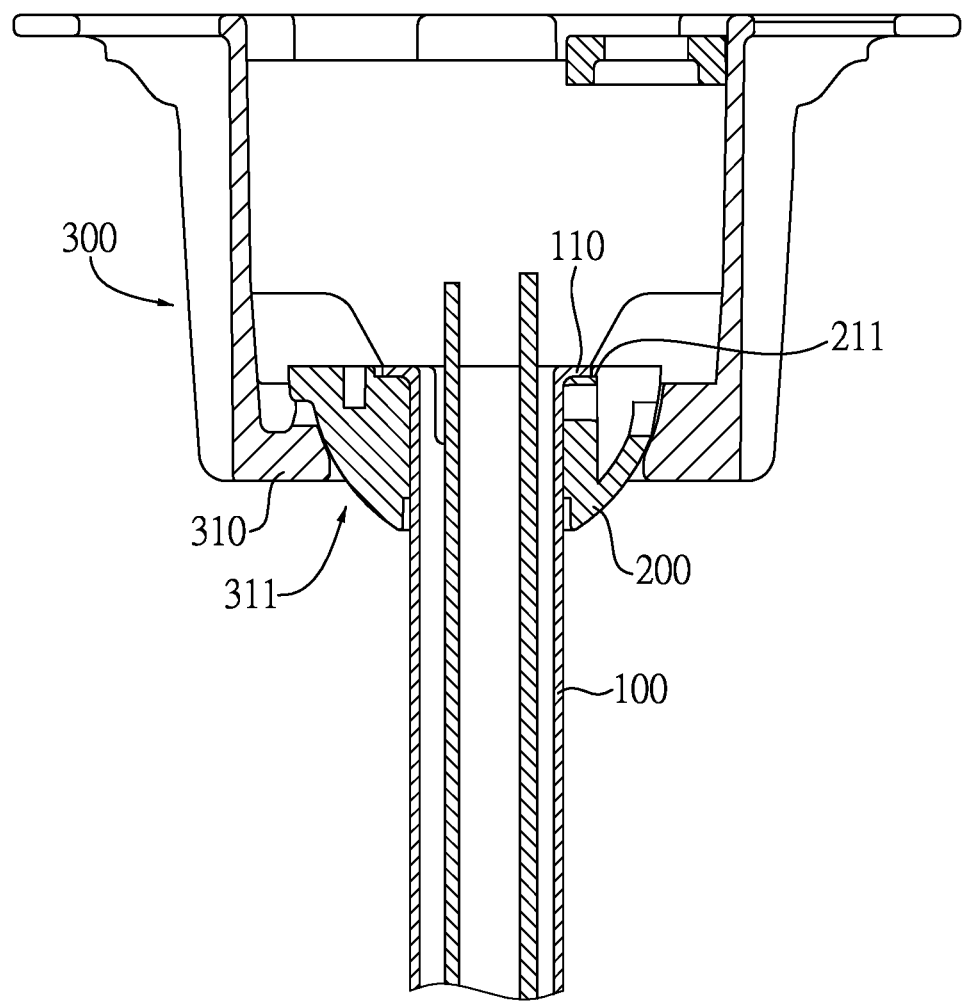
FIG. 4C is another side view in cross section of the assembling structure in FIG. 1, showing the hanging rod, the hanging ball, and the hanging bracket.
Figure 8:
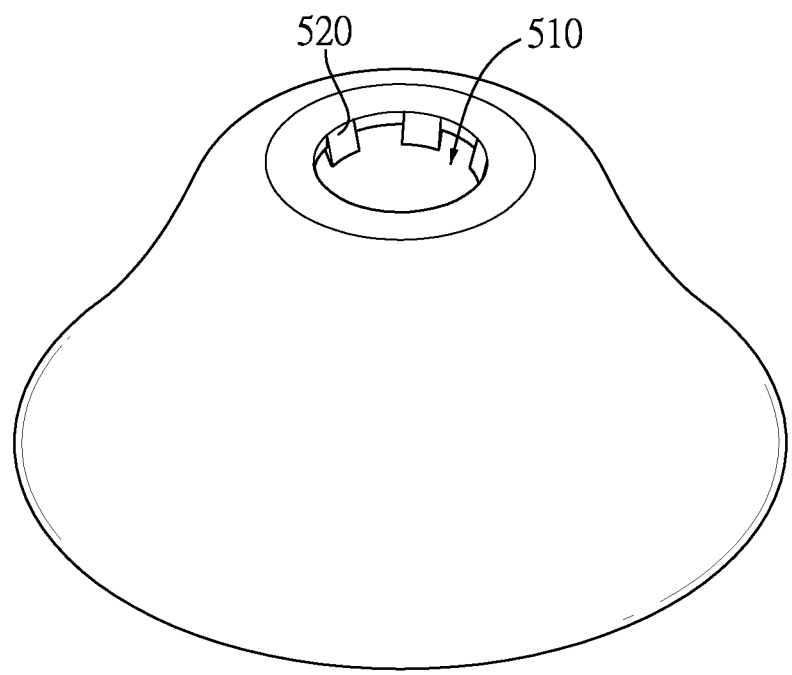
FIG. 8 is a perspective view of the assembling structure in FIG. 1, showing the lower cover.

Furthermore, with reference to FIGS. 2, 3, and 8, the assembling structure 10 further comprises a lower cover 500 covering the rod fixing component 400. The lower cover 500 has a second hole 510 formed on a center of the lower cover 500. The hanging rod 100 is mounted through the second hole 510. With the lower cover 500 covering the rod fixing component 400, the assembling structure 10 is visually appealing and dust-proof with noise reduced. Selectively, the lower cover 500 is made from plastic.

Additionally, with reference to FIGS. 2, 3, and 8, the assembling structure 10 further comprises at least one resilient segment 520 extending toward a center of the second hole 510. The resilient segment 520 elastically abuts the hanging rod 100, thereby preventing shaking and reducing noises caused by metal impact.

Wherein, an amount of the at least one resilient segment 520 is more than two or equal to two, and the resilient segments 520 are arranged apart along a circumference of the second hole 510. With the multiple resilient segments 520, the lower cover 500 abuts and clamps the hanging rod 100 more stably. Besides, the resilient segments 520 extend and incline downward so that the hanging rod 100 is mounted through the second hole 510 from a top of the lower cover 500 downward easily.

With reference to FIGS. 2, and 3, the assembling structure 10 further has an upper cover 600 connected to the hanging bracket 300 and covering the hanging ball 200 and the hanging bracket 300. Therefore, the assembling structure 10 is visually appealing and dust-proof with noise reduced. Selectively, the hanging bracket 300 is made from plastic or aluminum alloy so that the hanging bracket 300 is easily formed into shape as needed, is low in cost, and is light in weight.

In a preferred embodiment, with reference to FIGS. 3, 4A to 4C, and 9A to 9C, the ceiling mounting segment 320 of the hanging bracket 300 has an assembling board 321, which is configured to be flush with the ceiling and mounted to the ceiling, and the assembling board 321 is formed on a top end of the ceiling mounting segment 320. The assembling board 321 forms an elongated assembling slot for a screw to mount through to fix the assembling board 321 to the ceiling. The assembling board 321 has a board hole 3211 formed on a center of the assembling board 321, and at least one first assembling slot 3212 formed beside the board hole and being elongated. Some types of ceiling fans are each installed with a container to contain spare components and a slot is formed on the ceiling to receive the container. The container is mounted on a top of the hanging bracket 300. The container is fixed to the hanging bracket 300 by a fixing component such as a screw mounted through the first assembling slot 3212. In addition, the first assembling slot 3212 preserves a certain range of length for fitting the container in any size so that the hanging bracket 300 has good applicability.

Selectively, the assembling board 321 is flush with and mounted to the ceiling, thereby increasing the contact area and strengthening connection.

Specifically, with reference to FIGS. 9A to 9C, and 10, the ceiling mounting segment 320 of the hanging bracket 300 further has an assistant board 322 mounted on the top end of the ceiling mounting segment 320 and located in the board hole 3211 of the assembling board 321. The assistant board 322 has a second assembling slot 3221 mounted through the assistant board 322 and being elongated. An extending direction of the second assembling slot 3221 is same to an extending direction of the first assembling slot 3212. With the second assembling slot 3221 located in the board hole 3211 and the second assembling slot 3221 located between the first assembling slots 3212, a container in a smaller size can be installed.

Furthermore, with reference to FIGS. 9A to 9C, and 10, the assistant board 322 has an abutting segment 3222. The abutting segment 3222 is used to abut a bottom end of the assembling board 321. By this, after a fixing component such as a screw is mounted through the second assembling slot 3221 and is fixed to the container, the container abuts the top end of the assembling board 321 while the abutting segment 3222 abuts the bottom end of the assembling board 321, and therefore the abutting segment 3222 and the container clamp the assembling board 321 and the three components are fixed. Besides, the assistant board 322 is hung by the fixing component and the container so that no fixing component is needed to connect the assistant board 322 and the assembling board 321, and therefore the assistant board 322 is easy to be assembled and detached. Besides, in a preferred embodiment, the assistant board 322 is formed integrally.

Specifically, the assembling board 321 further has a third assembling slot 3213 formed through the assembling board 321 and being elongated. An extending direction of the third assembling slot 3213 is perpendicular to the extending direction of the first assembling slot 3212. The third assembling slot 3213 is designed to fit a container in another size. In other words, according to size variations of containers, a user is allowed to choose the first assembling slot 3212 or the third assembling slot 3213 to fix the container.

Wherein, when the container is fixed to the hanging bracket 300 through the first assembling slot 3212, the hanging bracket 300 can be fixed to the ceiling through the third assembling slot 3213. When the container is fixed to the hanging bracket 300 through the third assembling slot 3213, the hanging bracket 300 can be fixed to the ceiling through the first assembling slot 3212. Thus, there is no need to form a specialized connecting hole on the hanging bracket 300 to fix the hanging bracket 300 to the ceiling. Certainly, a specialized connecting hole can also be formed to enhance the connection strength between the hanging bracket 300 and the ceiling.

With reference to FIGS. 3 and 9A to 9C, a space is formed inside the hanging bracket 300 to contain a power adapter 30 which is used to supply electric power to the motor 20.

Figure 9A:
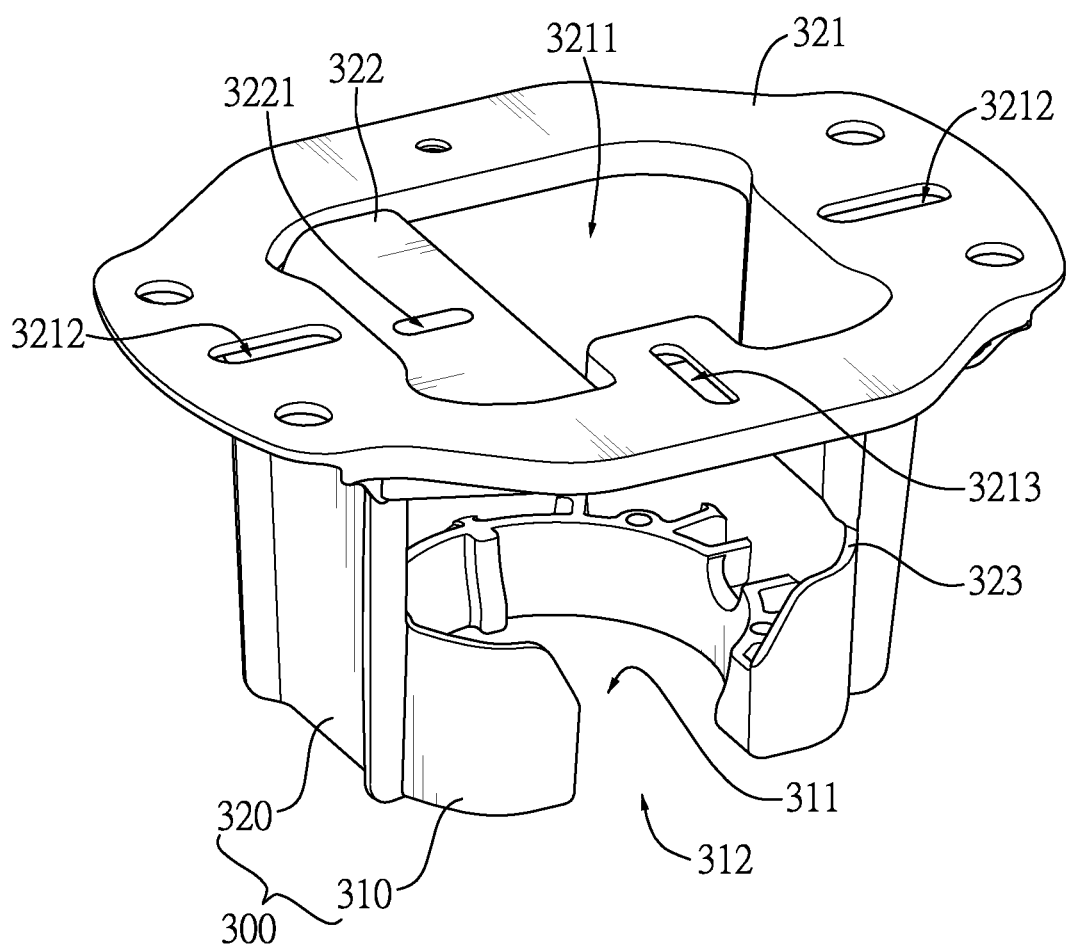
FIG. 9A is a perspective view of the assembling structure in FIG. 1, showing the hanging bracket.
Figure 9B:
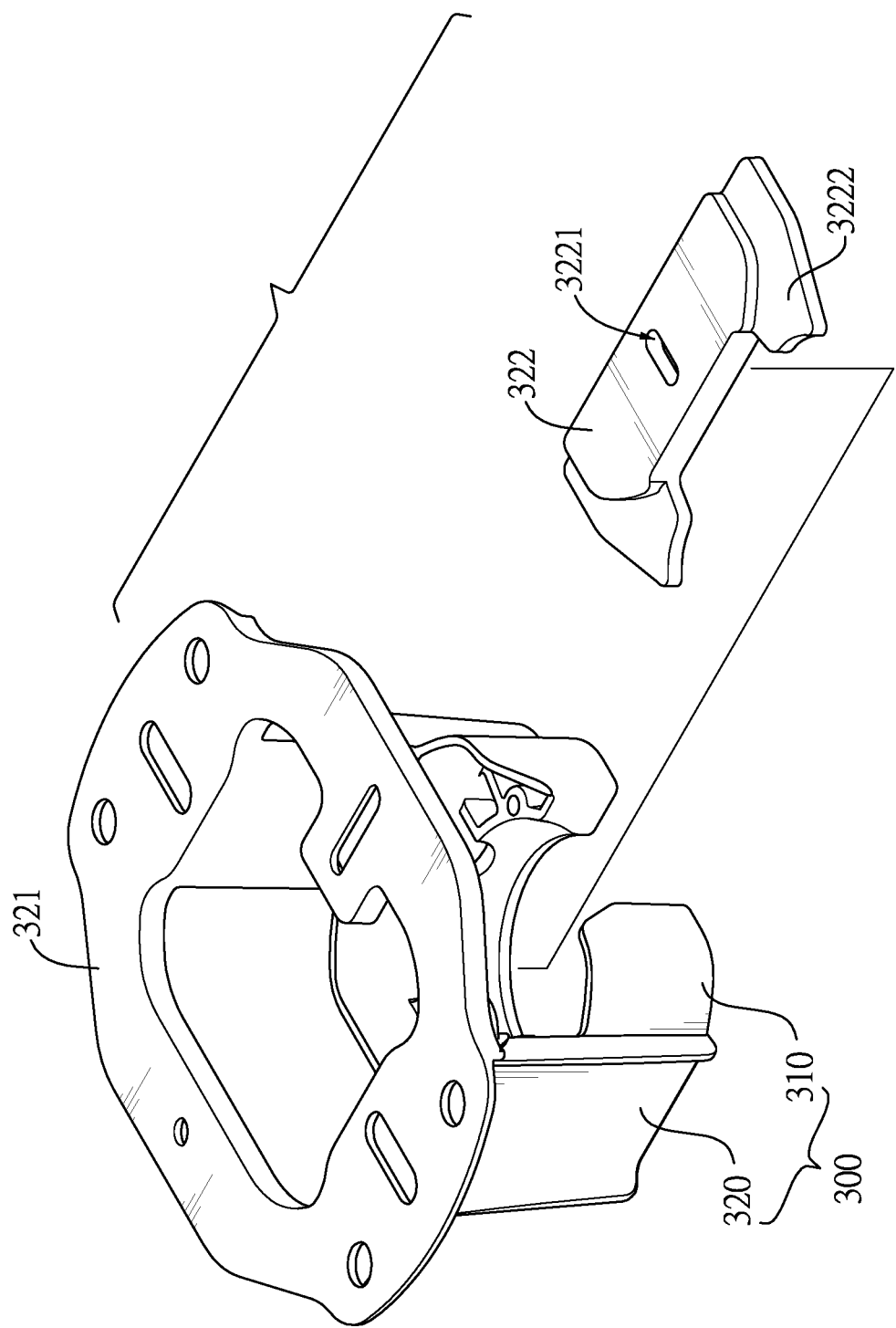
FIG. 9B is an exploded view of the assembling structure in FIG. 1, showing the hanging bracket and the assistant board.
Figure 9C:
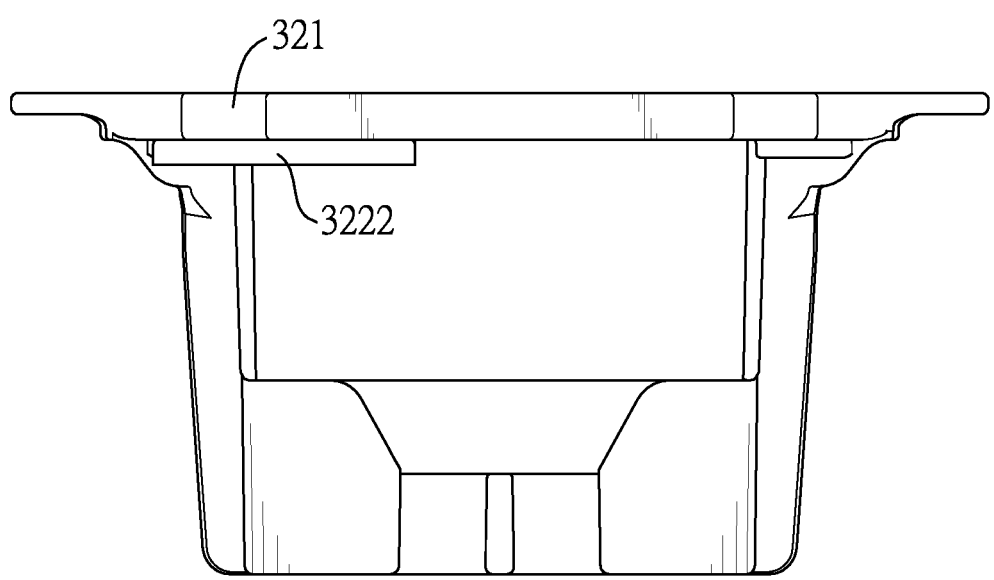
FIG. 9C is a side view of the assembling structure in FIG. 1, showing the hanging bracket and the assistant board.
Figure 10:
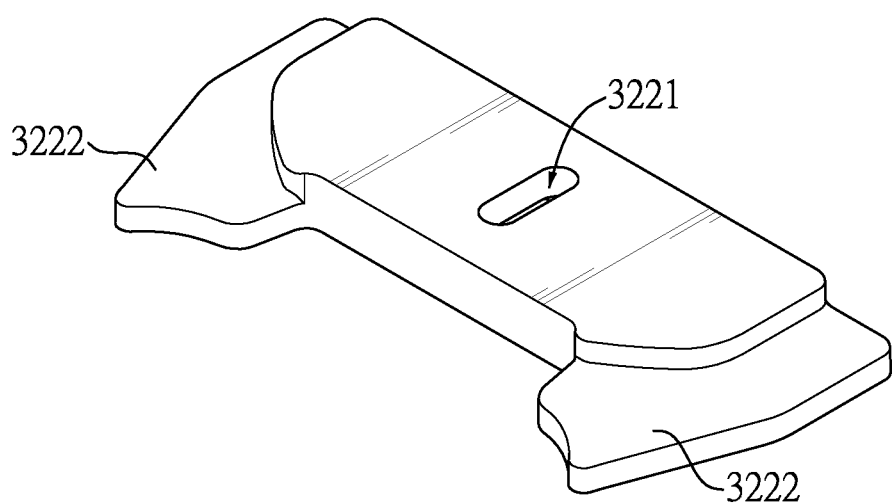
FIG. 10 is a perspective view of the assembling structure in FIG. 1, showing the assistant board of the hanging bracket.

With reference to FIG. 9A to 9C, the ceiling mounting segment 320 of the hanging bracket 300 has an adapter platform 323. The adapter platform 323 is located below the assembling board 321 and above the ball mounting segment 310. The space which is used to contain the power adapter 30 is formed between the adapter platform 323 and the assembling board 321. By this, a top surface of the power adapter 30 abuts the bottom end of the assembling board 321 and a bottom surface of the power adapter 30 abuts the adapter platform 323 so that the contact area between the power adapter 30 and the hanging bracket 300 is big enough to prevent shaking and the power adapter 30 is assembled inside the hanging bracket 300 firmly. Additionally, the adapter platform 323 is formed above the ball mounting segment 310 so that the bottom surface of the power adapter 30 abuts the adapter platform 323 instead of a top of the hanging ball 200, and therefore prevents shaking (because the top of the hanging ball 200 is not a flat surface). Specifically, with reference to FIG. 9A to 9C, the hanging bracket 300 has four adapter platforms 323 formed on four sides respectively in a preferred embodiment. With the four adapter platforms 323, the hanging bracket 300 supports the power adapter 30 much more stably.

With reference to FIG. 9A to 9C, the ball mounting segment 310 further has an opening 312 communicating with the hanging hole 311. The hanging rod 100 and the hanging ball 200 pass in and out of the hanging hole 311 via the opening 312.

By this, when the user is detaching the hanging rod 100 and the hanging ball 200 from the hanging bracket 300, the user first raises the hanging rod 100 to detach the bending edge 110 of the hanging rod 100 and the supporting platform 211 of the hanging ball 200. Then, the user horizontally moves the hanging rod 100 relative to the hanging bracket 300. At this moment, because the hanging ball 200 is no longer pressed by the hanging rod 100 to abut the periphery of the hanging hole 311, the hanging ball 200 is moved up relative to the hanging hole 311, is detached from the hanging hole 311 naturally, and is moved along with the hanging rod 100. After the user passes the hanging rod 100 and the hanging ball 200 through the opening 312, the hanging rod 100 and the hanging ball 200 are detached from the hanging bracket 300.

On the other hand, when the user is assembling the hanging rod 100 and the hanging ball 200 with the hanging bracket 300, the user first horizontally moves the hanging rod 100 and the hanging ball 200 through the opening 312 into the hanging hole 311. Then, the user releases the hanging rod 100 and makes the bending edge 110 abut the supporting platform 211. After the hanging rod 100 abuts the hanging ball 200 in surface contact, the assembling process is completed and the connection between the hanging rod 100 and the hanging ball 200 is stable.

The technical features in the abovementioned embodiment include the bending edge 110 of the hanging rod 100 abutting the supporting platform 211 of the hanging ball 200, the first assembling slot 3212, the second assembling slot 3221 and the third assembling slot 3213, the rod fixing component 400 being incompletely rigid, and the resilient segment 520 of the lower cover 500, adapted to be merged arbitrarily. The present invention can be implemented with or without any one of those technical features. Therefore, although all of the possible combinations of those technical features are not comprehensively described above, an embodiment of the present invention with any combination of those technical features should be considered as being described in this specification.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. An assembling structure for a ceiling fan, the assembling structure comprising:
   a hanging rod; a top end of the hanging rod forming a bending edge; a bottom end of the hanging rod adapted to be connected to a motor of a ceiling fan;
   a hanging ball having
      a first hole formed on a center of the hanging ball; the hanging rod mounted through the first hole; and
      a supporting wall formed on the center of the hanging ball and surrounding the first hole; the supporting wall having
         a supporting platform formed on a top end of the supporting wall and extending along a circumference of the first hole; the supporting platform abutting a bottom surface of the bending edge; and
   a hanging bracket having
      a ball mounting segment having
         a hanging hole formed on a center of the ball mounting segment; a diameter of the hanging hole being smaller than a diameter of the hanging ball; the hanging ball abutting downward a periphery of the hanging hole; the hanging rod mounted through the hanging hole; and
      a ceiling mounting segment connected to the ball mounting segment; the ceiling mounting segment adapted to be mounted on a ceiling; the ceiling mounting segment having
         an assembling board formed on a top end of the ceiling mounting segment and having
            a board hole formed on a center of the assembling board; and
            at least one first assembling slot formed beside the board hole and being elongated.

2. The assembling structure as claimed in claim 1, wherein
   the supporting wall forms at least one limiting groove;
   the hanging rod further has
      at least one limiting protrusion mounted in the at least one limiting groove.

3. The assembling structure as claimed in claim 2, wherein
   the supporting wall surrounds the first hole, and an inner surface of the supporting wall is flush with a side surface of the hanging rod.

4. The assembling structure as claimed in claim 3, wherein the assembling structure further comprises
   a rod fixing component; the hanging rod connected to the motor of the ceiling fan via the rod fixing component; the rod fixing component, the hanging rod, and a spindle of the motor mounted around one another in sequence; and
   three fixing holes formed through the hanging rod, the rod fixing component, and the spindle of the motor respectively; the fixing holes horizontally aligned with each other; and
   a fixing element mounted through the fixing holes.

5. The assembling structure as claimed in claim 4, wherein the rod fixing component is made from plastic or rubber.

6. The assembling structure as claimed in claim 5, wherein the assembling structure further comprises
   a lower cover covering the rod fixing component and having
      a second hole formed on a center of the lower cover; the hanging rod mounted through the second hole; and
      at least one resilient segment extending toward a center of the second hole, and abutting the hanging rod.

7. The assembling structure as claimed in claim 1, wherein
   the supporting wall surrounds the first hole, and an inner surface of the supporting wall is flush with a side surface of the hanging rod.

8. The assembling structure as claimed in claim 1, wherein the assembling structure further comprises
   a rod fixing component; the hanging rod connected to the motor of the ceiling fan via the rod fixing component; the rod fixing component, the hanging rod, and a spindle of the motor mounted around one another in sequence; and
   three fixing holes formed through the hanging rod, the rod fixing component, and the spindle of the motor respectively; the fixing holes horizontally aligned with each other; and
   a fixing element mounted through the fixing holes.

9. The assembling structure as claimed in claim 8, wherein the rod fixing component is made from plastic or rubber.

10. The assembling structure as claimed in claim 8, wherein the assembling structure further comprises
    a lower cover covering the rod fixing component and having
       a second hole formed on a center of the lower cover; the hanging rod mounted through the second hole; and
       at least one resilient segment extending toward a center of the second hole, and abutting the hanging rod.

11. The assembling structure as claimed in claim 10, wherein an amount of the at least one resilient segment is more than two or equal to two; the resilient segments are arranged apart along a circumference of the second hole; the resilient segments extend and incline downward.

12. The assembling structure as claimed in claim 6, wherein an amount of the at least one resilient segment is more than two or equal to two; the resilient segments are arranged apart along a circumference of the second hole; the resilient segments extend and incline downward.

13. The assembling structure as claimed in claim 12, wherein the ceiling mounting segment of the hanging bracket further has an assistant board mounted on the top end of the ceiling mounting segment and located in the board hole of the assembling board; the assistant board having
a second assembling slot mounted through the assistant board and being elongated; an extending direction of the second assembling slot being same as an extending direction of the first assembling slot.

14. The assembling structure as claimed in claim 13, wherein the assembling board further has
a third assembling slot formed through the assembling board and being elongated; an extending direction of the third assembling slot being perpendicular to an extending direction of the first assembling slot.

15. The assembling structure as claimed in claim 13, wherein the assembling board further has
a third assembling slot formed through the assembling board and being elongated; an extending direction of the third assembling slot being perpendicular to the extending direction of the first assembling slot.

16. The assembling structure as claimed in claim 1, wherein the ceiling mounting segment of the hanging bracket further has
an assistant board mounted on the top end of the ceiling mounting segment and located in the board hole of the assembling board; the assistant board having
a second assembling slot mounted through the assistant board and being elongated; an extending direction of the second assembling slot being same as an extending direction of the first assembling slot.

\* \* \* \* \*